Jan. 15, 1952
P. H. TAYLOR
2,582,362
PHOTOGRAPHIC TRIPLET OBJECTIVE
Filed July 3, 1950
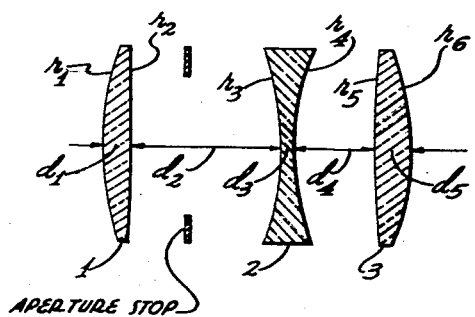
INVENTOR:
PHILIP H. TAYLOR
HIS PATENT ATTORNEY Patented Jan. 15, 1952

2,582,362

UNITED STATES PATENT OFFICE 2,582,362

PHOTOGRAPHIC TRIPLET OBJECTIVE

Philip H. Taylor, Los Angeles, Calif., assignor to Northrop Aircraft, Inc., Hawthorne, Calif., a corporation of California Application July 3, 1950, Serial No. 171,789

2 Claims. (Cl. 88—57)

This invention relates to photographic triplets and it is an object of the invention to provide a photographic triplet producing sharp photographic images over a field of ten degrees and throughout the spectral region to which panchromatic emulsions are sensitive.

In the present invention three lens components are separated by two air spaces, and a stop is located between the first two elements. With this lens arrangement, spherical aberration, astigmatism, curvature of the field, the sine condition, coma, and distortion corrections can be attained without producing unduly serious amounts of any aberrations.

In the drawing, the single figure illustrates a lens assembly which comprises three lens members that are axially aligned and air spaced. Lenses 1 and 3 are simple collective bi-convex lenses and an intermediate lens 2 is a dispersive bi-concave lens. A stop is located about 0.70 inch from the pole of the second surface having a radius $r_2$. The triplet objective shown has a speed of f/4.9 and an effective focal length of 7 inches. The radii of the three lenses have been indicated as $r_1$ and $r_2$, $r_3$ and $r_4$, $r_5$ and $r_6$. The lenses are separated by air spaces $d_2$ and $d_4$ and have axial thickness $d_1$, $d_3$, and $d_5$ from front to rear, respectively.

Construction data for a f/4.9 and 7 inch focal length photographic triplet corrected to produce perfect photographic images over a 10 degree field and achromatized for C and F lines of sunlight, built in accordance with this invention is as follows:

Optical prescription

[All dimensions in inches.]

| Prescription | Glass | $N_F$ | $N_D$ | $N_C$ | V |
|---|---|---|---|---|---|
| $r_1 =$ 2.2223 $d_1 =$ .2000 $r_2 =$ −46.3671 $d_2 =$ 1.1453 $r_3 =$ −2.2699 | BSC-2 | 1.52264 | 1.51700 | 1.51462 | 64.5 |
| $d_3 =$ .1000 $r_4 =$ 2.0429 $d_4 =$ .6326 | DF-2 | 1.62901 | 1.61700 | 1.61216 | 36.6 |
| $r_5 =$ 7.1082 $d_5 =$ .3000 $r_6 =$ −1.9900 | LBC-2 | 1.57950 | 1.57250 | 1.56960 | 57.8 |

Clear diameter=1.452
Pole of surface 2 to stop=.7026
Diameter of stop=1.170
$f'$=7.0691
$l'$=5.6549
$f/4.9$ where
$r$ is the radius length for an element surface;
$d$ is the axial thickness of an element;
$N_F$ is the index of refraction for the F line of hydrogen (4861 Å.);
$N_D$ is the index of refraction for the D line of sodium (5893 Å.);
$N_C$ is the index of refraction for the C line of hydrogen (6563 Å.);
$V = \frac{N_D - 1}{N_F - N_C}$;
BSC-2 is a borosilicate crown glass;
DF-2 is a dense flint glass;
LBC-2 is a light barium crown glass;
$f'$ is the focal length; and
$l'$ is the back focal length.

The performance of the above prescribed system can be seen from the following aberrations and optical tolerances:

| | Aberration | Tolerance |
|---|---|---|
| 1 | $LA' = .0015$ | ±.0080. |
| 2 | $LZA' = .0166$ | ±.0120 |
| 3 | $OSC' = -.00166$ | ±.00250 (empirical tolerance) |
| 4 | $L'Z_C - L'Z_F = .0066$ | ±.0020 |
| 5 | "Zonal $g_1$" $= -.00347$ | ±.00250 (empirical tolerance) |
| 6 | $Coma'_i = -.00463$ | |
| 7 | $Coma'_s = -.00154$ | (extremely sharp definition) |
| 8 | $X'_T = -.0432$ | |
| 9 | $X'_T \tan U'_M = -.0044$ | (good definition) |
| 10 | Tang. $LA' = -.0301$ | ±.0080 |
| 11 | $TADF' = -.0122$ | |
| 12 | $(TADF') \tan U'_M = -.0013$ | (extremely sharp definition) |
| 13 | $X'_t = -.0116$ | |
| 14 | $X'_t \tan U'_M = .0010$ | (extremely sharp definition) |
| 15 | $X'_s = .0006$ | |
| 16 | $Dist' = -.00052$ | .06% (entirely invisible) |
| 17 | $TCh'_{D,F} = .00037$ | (negligible) | where

LA' is the spherical aberration equal to the back focal length of the paraxial ray minus the back focal length of the marginal ray;

LZA' is the longitudinal zonal aberration;

OSC' is the offense against the sine condition;

$L'Z_c - L'Z_f$ is the difference in distance of the intersections of the zonal rays on the optical axis of the c and F lines of sunlight;

Zonal $g_7$ is a third order coefficient which is indicative of lateral color error;

Coma'$_t$ is coma error in the tangential plane;

Coma'$_s$ is the coma error in the sagittal plane;

X'$_T$ is the distance from a selected focal plane to the focal point of an off axis object in the tangential plane; (a prime always refers to the image space).

Tan U'$_M$ is one-half the f number;

Tang. LA' is lateral spherical aberration;

TADF' is the true astigmatic difference of focus;

X'$_t$ is the distance from a selected focal plane to the focal point of an off axis object for the principal ray in the tangential plane;

X'$_s$ is the distance from a selected focal plane to the focal point of an off axis object for the principal ray in the sagittal plane;

Dist' is the measure of distortion;

TChr'$_{D,F}$ is the lateral chromatic aberration for the D and F lines of sunlight, or any other pair of monochromatic points in the spectrum.

The prescription given above can easily be varied to suit various purposes as may be desired, by a simple scaling procedure.

When the radii, thicknesses and diameters of the component lenses, for example, are each multiplied by a constant, and when the effective focal length, the back focal length, the linear size of the field, and the aberrations of the original system are multiplied by the same constant, precise values for the new system will be obtained. It is to be carefully noted that speed (or f/No.) and angular size of the field are not changed. Neither are the optical tolerances changed. It, therefore, follows that if a system of given focal length performs satisfactorily, its optical behavior can always be improved by constructing a smaller scale model. Should a larger scale model be desired, consideration must be given to the ratio each aberration bears to its tolerance in the original prescription, since this ratio is subject to multiplication by the scaling constant.

What is claimed is:

1. An objective lens of the character described comprising three axially aligned and airspaced lens members, the first and third members being simple collective bi-convex lenses, the second member being a dispersive bi-concave lens, and an aperture stop in the air space between said first and third members, said system having the following prescription:

| Prescription | Glass | $N_F$ | $N_D$ | $N_C$ | V |
|---|---|---|---|---|---|
| $r_1=$ 2.2223<br>$d_1=$ .2000<br>$r_2=$ −46.3671<br>$d_2=$ 1.1453<br>$r_3=$ −2.2699 | BSC-2 | 1.52264 | 1.51700 | 1.51462 | 64.5 |
| $d_3=$ .1000<br>$r_4=$ 2.0429<br>$d_4=$ .6326<br>$r_5=$ 7.1082 | DF-2 | 1.62901 | 1.61700 | 1.61216 | 36.6 |
| $d_5=$ .3000<br>$r_6=$ −1.9900 | LBC-2 | 1.57950 | 1.57250 | 1.56960 | 57.8 | where r is the radius length for an element surface;
d is the axial thickness of an element;
$N_F$ is the index of refraction for the F line of hydrogen (4861 Å.);
$N_D$ is the index of refraction for the D line of sodium (5893 Å.);
$N_C$ is the index of refraction for the C line of hydrogen (6563 Å.);
$V = \frac{N_D - 1}{N_F - N_C}$;
BSC-2 is a borosilicate crown glass;
DF-2 is a dense flint glass;
LBC-2 is a light barium crown glass;
f' is the focal length; and
l' is the back focal length.

2. An objective lens system of the character described comprising three axially aligned and air spaced lens members, the first and third members being simple collective bi-convex lenses, the second member being a dispersive bi-concave lens, and an aperture stop in the space between said first and second members, said system being built in accordance with a formula wherein the values for radii, thicknesses and diameters of the component lenses, the effective focal length, back focal length, and linear size of the field as indicated below are each multiplied by a constant K differing from zero:

| Prescription | Glass | $N_F$ | $N_D$ | $N_C$ | V |
|---|---|---|---|---|---|
| $r_1=$ 2.2223<br>$d_1=$ .2000<br>$r_2=$ −46.3671<br>$d_2=$ 1.1453<br>$r_3=$ −2.2699 | BSC-2 | 1.52264 | 1.51700 | 1.51462 | 64.5 |
| $d_3=$ .1000<br>$r_4=$ 2.0429<br>$d_4=$ .6326<br>$r_5=$ 7.1082 | DF-2 | 1.62901 | 1.61700 | 1.61216 | 36.6 |
| $d_5=$ .3000<br>$r_6=$ −1.9900 | LBC-2 | 1.57950 | 1.57250 | 1.56960 | 57.8 |

PHILIP H. TAYLOR.

REFERENCES CITED

The following references are of record in the file of this patent:

UNITED STATES PATENTS

| Number | Name | Date |
|---|---|---|
| 1,892,162 | Richter | Dec. 27, 1932 |
| 1,987,878 | Tronnier | Jan. 15, 1935 |
| 2,298,090 | Warmisham | Oct. 6, 1942 |
| 2,388,869 | Reiss | Nov. 13, 1945 |
| 2,430,550 | Altman et al. | Nov. 11, 1947 |
| 2,487,873 | Herzberger et al. | Nov. 15, 1949 |